United States Patent
Chen et al.

(10) Patent No.: US 11,609,170 B2
(45) Date of Patent: Mar. 21, 2023

(54) GEL-TIME DETECTION APPARATUS, GEL-TIME DETECTION METHOD, METHOD FOR DETERMINING A TORQUE THRESHOLD FOR GEL-TIME DETECTION, AND METHOD FOR DETERMINING AN AREA-SHRINKAGE-RATE THRESHOLD FOR GEL-TIME DETECTION

(71) Applicant: Wistron Corporation, New Taipei (TW)

(72) Inventors: Ta-Yu Chen, New Taipei (TW); Chin-Feng Tseng, New Taipei (TW); Jang-Yi Shiue, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 17/488,257

(22) Filed: Sep. 28, 2021

(65) Prior Publication Data
US 2023/0028622 A1   Jan. 26, 2023

(30) Foreign Application Priority Data
Jul. 21, 2021   (TW) .................................. 110126715

(51) Int. Cl.
*G01N 11/14* (2006.01)
*G01B 11/28* (2006.01)

(52) U.S. Cl.
CPC ............ *G01N 11/14* (2013.01); *G01B 11/285* (2013.01)

(58) Field of Classification Search
CPC ......... G01N 11/14; G01N 2291/02818; G01N 11/00; G01N 11/10; G01N 11/162; G01N 2203/0092
See application file for complete search history.

(56) References Cited

U.S. PATENT DOCUMENTS 7,207,210 B2 *  4/2007  Moonay ................. G01N 11/14
                                                        73/54.28
9,522,997 B2 * 12/2016  Hatae ...................... H01B 3/40
(Continued)

FOREIGN PATENT DOCUMENTS

DE   3636872 A1 *  5/1988  ............. G01N 11/00
GB   1561828 A  *  3/1980  ............. C08G 59/42

OTHER PUBLICATIONS

Machine translation of DE 3636872 A1 which originally published on May 11, 1988. (Year: 1988).*
ASTM D4217-07 (Reapproved 2013), Jul. 2013. (Year: 2013).*

*Primary Examiner* — David A. Rogers
(74) *Attorney, Agent, or Firm* — Winston Hsu

(57) ABSTRACT

A gel-time detection apparatus includes a carrier, a stirring device, and an image-capturing device. The gel-time detection apparatus uses the carrier to liquefied powder to be detected, uses the stirring device to stir the liquefied powder and sense the torque of stirring the liquefied powder, and uses the image-capturing device to capture images of the liquefied powder, so as to determine a gel time according to a determination criterion relevant to the torque and the images. A gel-time detection method includes liquefying powder to be detected, stirring the powder, sensing the torque of stirring the liquefied powder, capturing images of the liquefied powder, and then determining a gel time according to a determination criterion relevant to the torque and the images. The determination criterion may include a torque predetermined threshold and an area-shrinkage-rate predetermined threshold.

17 Claims, 9 Drawing Sheets

(56) References Cited

U.S. PATENT DOCUMENTS

| | | | |
|---|---|---|---|
| 9,718,986 B2* | 8/2017 | Liao .................... | C09D 163/00 |
| 10,149,651 B2* | 12/2018 | Kavehpour ............ | G01N 11/14 |
| 2012/0234107 A1* | 9/2012 | Pindiprolu ............. | G01N 11/14 |
| | | | 73/862.331 |
| 2015/0183976 A1* | 7/2015 | Banda ................... | C09J 133/12 |
| | | | 428/195.1 |

* cited by examiner

GEL-TIME DETECTION APPARATUS, GEL-TIME DETECTION METHOD, METHOD FOR DETERMINING A TORQUE THRESHOLD FOR GEL-TIME DETECTION, AND METHOD FOR DETERMINING AN AREA-SHRINKAGE-RATE THRESHOLD FOR GEL-TIME DETECTION

BACKGROUND OF THE INVENTION

1. Field of the Invention

The present invention relates to a gel-time detection apparatus and a method thereof, and more particularly to a detection apparatus that determines a gel time according to a stirring torque and an area of liquefied powder and a method thereof. The present invention relates to a detection apparatus that detects a gel time of a prepreg and a method thereof, and more particularly to a detection apparatus that detects a gel time of a prepreg for copper clad laminate and a method thereof.

2. Description of the Prior Art

In some copper clad laminate (CCL) processes, an impregnation process is used to soak the glass fiber cloth in plastic buckets of different formulations to form a prepreg (or adhesive sheet, film). The finished adhesive sheet can be pressed with a copper foil to form CCL. In order to provide a basis for setting process parameters when using the adhesive sheet, the gel time will be tested after the adhesive sheet is completed. Currently, the gel time is artificially determined. In general, the way is to remove a piece of leftover material of an adhesive sheet first, and rub it against each other into powder. After the powder is sieved, 0.2 grams of the sieved powder is taken out and placed on a thermostatic plate for heating. After standing for 20 seconds, the operator continuously stirs the powder on the thermostatic plate with a stirring rod. Through visual inspection, the operator can observe that the powder will be liquefied, transformed into a viscous shape, and finally condensed into a mass, and then the operator can artificially determine the gel time. However, in the aforementioned operation processes, in principle, only the heating of the thermostatic plate itself and the standing time of the powder can be objectively fixed, and the rest of the operation stages involve the subjective determination of the operator, affecting the determination of the gel time. Even if standard operating procedures can be used to standardize the operation of each stage, it is still difficult to eliminate or effectively reduce the subjective influence of the operator, so that the deviation of the determined gel times is still large. For example, 0.2 gram sample size is too small, and a small amount of error can cause a large sample proportion error. It is not easy to manually place the powder on the thermostatic plate with the same distribution every time, and it is also difficult to stir the powder (and liquefied powder thereof) in the same way (e.g. the stirring trajectory of a stirring rod, such as the size and range of a circle, etc.). The determination of gel time is easily affected by environmental conditions, such as ambient light, the surface of the thermostatic plate (e.g. residual impurities, color changes caused by the oxidation of the surface of the thermostatic plate, etc.). Furthermore, different operators have different subjective influences on the determination of gel time.

SUMMARY OF THE INVENTION

An objective of the invention is to provide a gel-time detection apparatus, which can automatically determine a gel time to eliminate or effectively reduce the subjective influence of operators.

A gel-time detection apparatus of an embodiment according to the invention includes a carrier, a stirring device, an image-capturing device, and a controller. The carrier is used for carrying powder to be detected and heating the powder to be liquefied into liquefied powder. The stirring device includes a stirring rod and a torque meter coupled with the stirring rod. The stirring rod stirs the liquefied powder. The torque meter senses a torque of the stirring rod stirring the liquefied powder. The image-capturing device is disposed toward the carrier to capture images of the liquefied powder. The controller is electrically connected to the stirring device and the image-capturing device. The controller determines a gel time of the powder according to a determination criterion relevant to the torque and the images. Thereby, the controllable operation of the gel-time detection device can eliminate or effectively reduce the influence of inconsistent operation by the operators on the gel time determination. Furthermore, the gel-time detection apparatus can determine the gel time through objective torque sensing and images of liquefied powder, and can also eliminate or effectively reduce the influence of operator's subjective determination on the gel time.

Another objective of the invention is to provide a gel-time detection method, which can automatically determine a gel time to eliminate or effectively reduce the subjective influence of operators.

A gel-time detection method of an embodiment according to the invention includes the following steps of: placing powder to be detected on a carrier; heating the powder through the carrier to liquefy the powder into liquefied powder; continuously stirring the liquefied powder through a stirring rod; periodically sensing a torque of the stirring rod stirring the liquefied powder through a torque meter; periodically capturing images of the liquefied powder through an image-capturing device; and determining a gel time of the powder according to a determination criterion relevant to the torque and the images. Thereby, the gel-time detection method uses the controllable device operation to eliminate or effectively reduce the influence of inconsistent operation by the operators on the gel time determination. Furthermore, the gel-time detection method can determine the gel time through objective torque sensing and images of liquefied powder, and can also eliminate or effectively reduce the influence of operator's subjective determination on the gel time.

Another objective of the invention is to provide a method for determining a torque threshold for gel-time detection, which can eliminate or effectively reduce the influence of operator's subjective determination on the gel time.

A method for determining a torque threshold for gel-time detection of an embodiment according to the invention includes the following steps of: placing test powder on a carrier; heating the test powder through the carrier to liquefy the test powder into liquefied test powder; continuously stirring the liquefied test powder through a stirring rod; sensing a torque of the stirring rod stirring the liquefied test powder through a torque meter, and recording a curve of the torque versus time; recording a tentative gel time entered manually corresponding to the curve; and repeating the above steps several times to obtain a plurality of the curves and a plurality of the tentative gel times, and calculating a predetermined threshold as the torque threshold according to the curves and the tentative gel times. Thereby, the method can provide an objective determination criterion for determining a gel time in gel-time detection.

Another objective of the invention is to provide a method for determining an area-shrinkage-rate threshold for gel-time detection, which can eliminate or effectively reduce the influence of operator's subjective determination on the gel time.

A method for determining an area-shrinkage-rate threshold for gel-time detection of an embodiment according to the invention includes the following steps of: placing test powder on a carrier; heating the test powder through the carrier to liquefy the test powder into liquefied test powder; continuously stirring the liquefied test powder through a stirring rod; periodically capturing images of the liquefied test powder through an image-capturing device, and recording an area vs. time curve of the liquefied test powder in the images; recording a tentative gel time manually entered corresponding to the curve; and repeating the above steps several times to obtain a plurality of the curves and a plurality of the tentative gel times, and calculating a predetermined threshold as the area-shrinkage-rate threshold according to the curves and the tentative gel times. Thereby, the method can provide an objective determination criterion for determining a gel time in gel-time detection.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
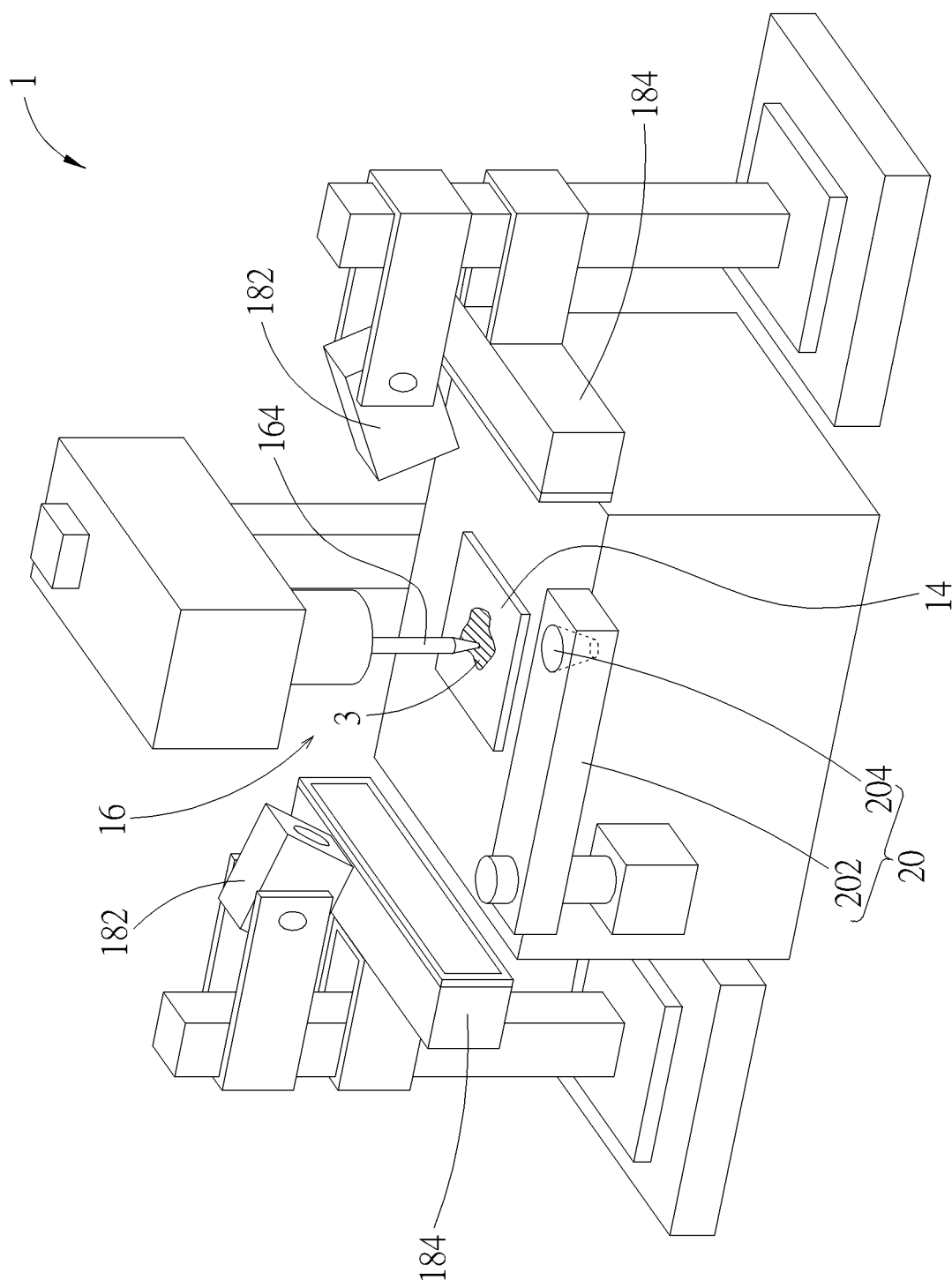
FIG. 1 is a schematic diagram illustrating a gel-time detection apparatus of an embodiment according to the invention.
Figure 2:
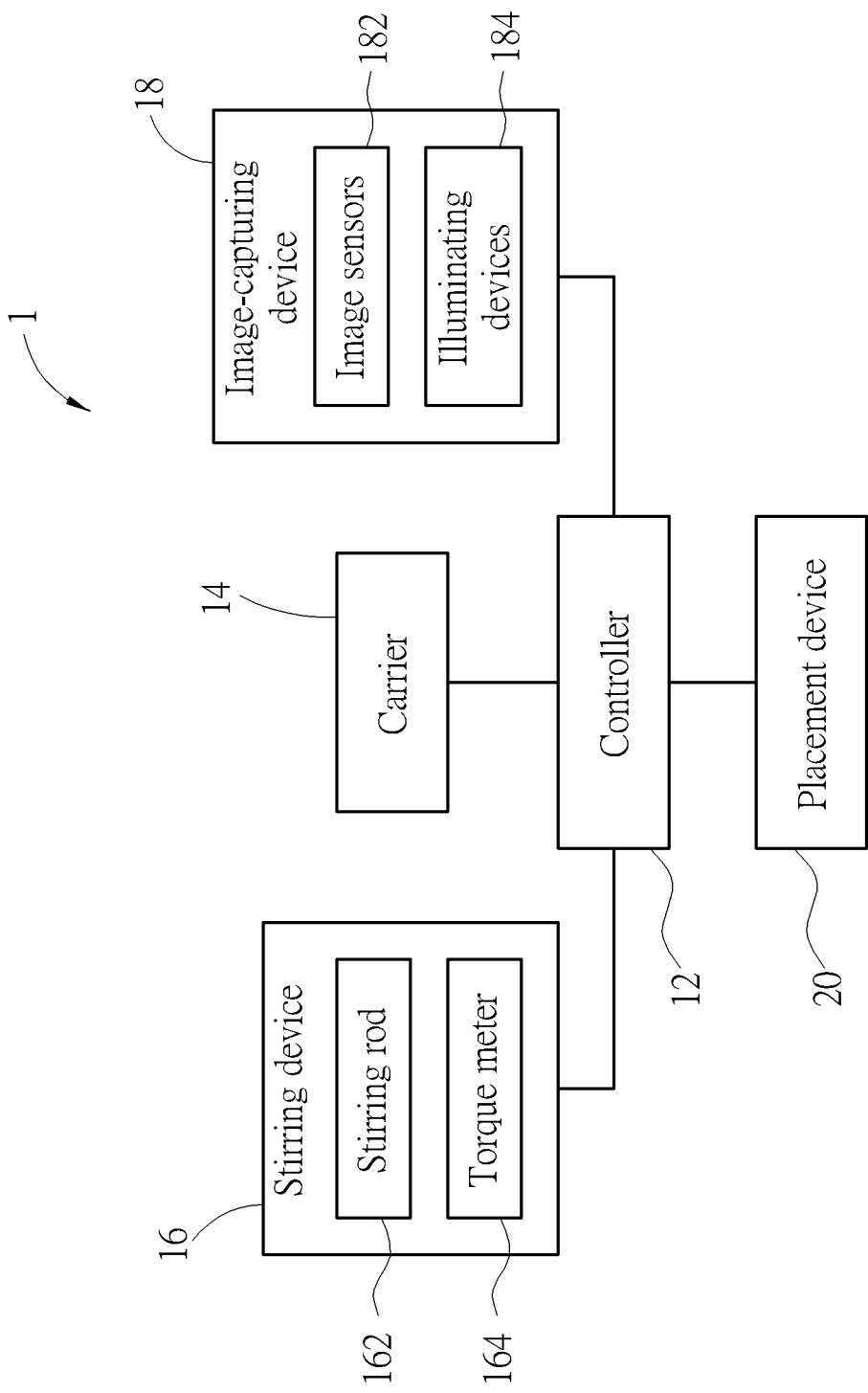
FIG. 2 is a functional block diagram of the gel-time detection apparatus in FIG. 1.
Figure 3:
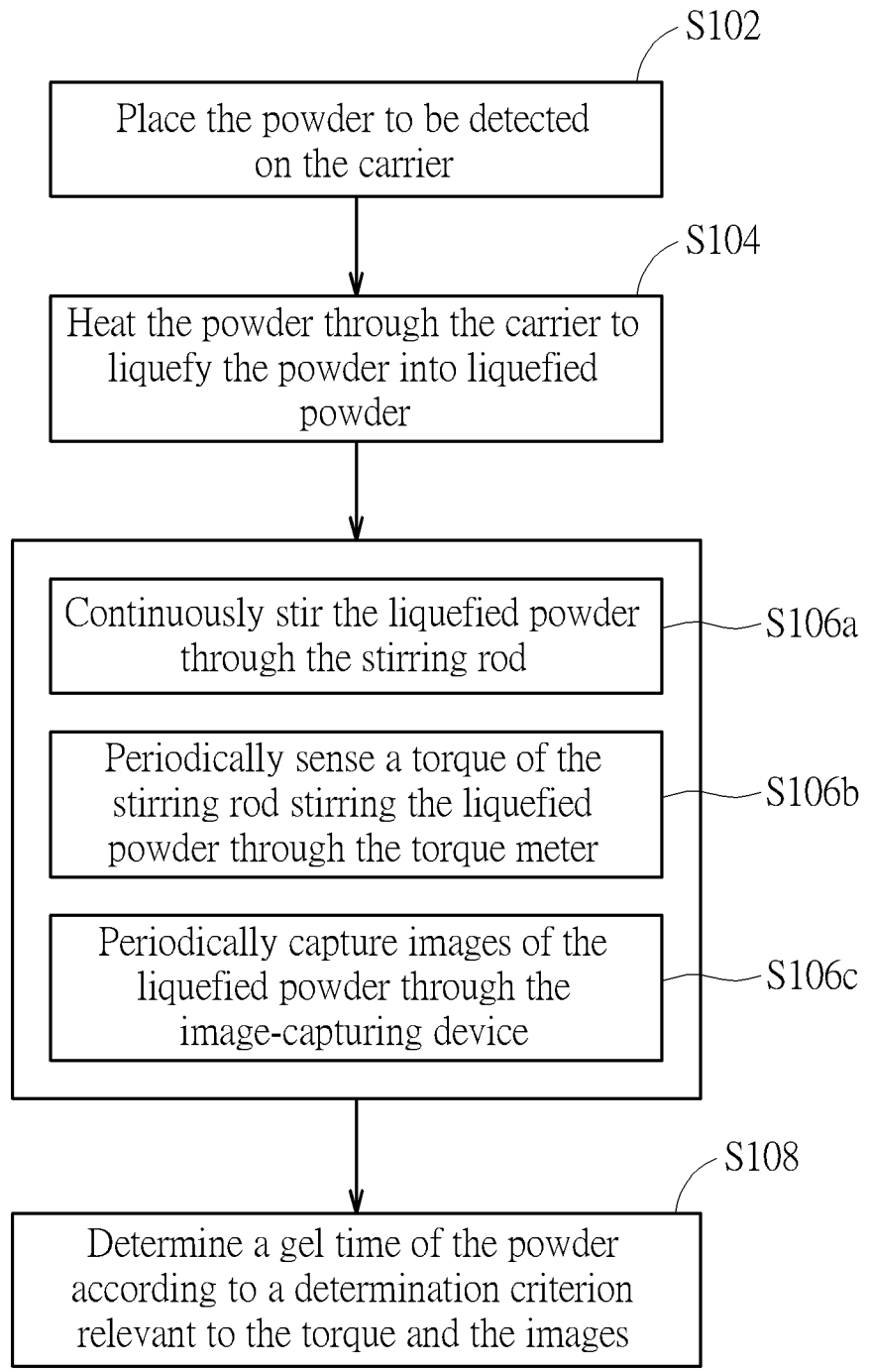
FIG. 3 is a flow chart of a gel-time detection method according to the invention.

Please refer to FIG. 1 to FIG. 3. A gel-time detection apparatus 1 of an embodiment according to the invention includes a controller 12, a carrier 14, a stirring device 16, and an image-capturing device 18. The controller 12 is electrically connected to the carrier 14, the stirring device 16, and the image-capturing device 18 and controls the operation thereof. The carrier 14 is used for carrying powder 3 to be detected and heating the powder 3 to be liquefied into liquefied powder (shown by a hatched area in FIG. 1). The stirring device 16 includes a stirring rod 162 and a torque meter 164 coupled with the stirring rod 162. The stirring rod 162 stirs the liquefied powder 3. The torque meter 164 senses a torque of the stirring rod 162 stirring the liquefied powder 3. The image-capturing device 18 is disposed toward the carrier 14 to capture images of the liquefied powder 3. The controller 12 determines a gel time of the powder 3 according to a determination criterion relevant to the torque and the images. Because the stirring of the powder 3 (or the liquefied powder 3), the reading of the torque, and the determination of the status of the liquefied powder 3 in the images are all implemented by the gel-time detection apparatus 1, the above actions are objective relative to manual operations in principle, which can eliminate or effectively reduce the subjective influence of operators and then solve the problem in the prior art that manual operation and judgment subjectively affects the determination of the gel time, or effectively reduce the subjective influence of operators. Furthermore, because the determination criterion is set based on the stirring torque and the images of the liquefied powder, the gel-time detection apparatus 1 can objectively determine the gel time of the liquefied powder 3 according to the sensed torque, the captured images, and the determination criterion. In principle, when the liquefied powder 3 gels gradually, the stirring torque increases gradually, and the area of the liquefied powder 3 (in the image) generally decreases. Therefore, in practice, the determination criterion may include that the torque is greater than a predetermined threshold and the area shrinkage rate of the liquefied powder 3 in the images reaches a predetermined threshold.

In the embodiment, the carrier 14 can be implemented by a plate with heaters (such as heating wires, heating rods, thermoelectric coolers, or a combination thereof, etc.) to provide a temperature-controllable stirring environment. In practice, the temperature of the carrier 14 can be set according to the adhesive composition of the powder 3 or its test specifications. The stirring device 16 realizes the stirring of the powder 3 (or liquefied powder 3) basically by eccentrically rotating the stirring rod 162. In practice, the required stirring trajectory for the stirring rod 162 can be designed through a suitable mechanism (such as a gear set, a servo motor, etc.), which will not be described in addition. In practice, the torque meter 164 can be incorporated into the mechanism that rotates the stirring rod 162, for example, using a rotating mechanism with controllable torque.

The image-capturing device 18 includes two image sensors 182 (e.g. CCD, CMOS or other components capable of capturing images) and two illuminating devices 184 (e.g. LED, halogen lamp, etc.). The image sensors 182 are disposed oppositely, which helps to capture images of the whole liquefied powder 3. For example, one of the image sensors 182 is blocked by the stirring rod 162 or other components and cannot capture an image of the whole liquefied powder 3; the other one of the image sensors 182 can capture an image of the whole liquefied powder 3. In another example, each of the image sensors 182 capture an image of part of the liquefied powder 3, and the images combine to form a complete image. In practice, it is practicable to dispose less or more image sensors. Setting more image sensors will enhance the aforementioned effect. The illuminating devices 184 are disposed oppositely, which helps to provide the liquefied powder 3 enough illumination for obtaining qualified images (for example, one of the illuminating devices 184 is blocked by the stirring rod 162 or other components and cannot illuminate the whole liquefied powder 3; the other one of the illuminating devices 184 can illuminate the whole liquefied powder 3). In practice, it is practicable to dispose less or more illuminating devices. Setting more illuminating devices will enhance the aforementioned effect. Furthermore, the numbers of the image sensors 182 and illuminating devices 184 are not limited to be the same. In addition, the image-capturing device 18 is not located above the liquefied powder 3, which can avoid the influence of gas escaped from the liquefied powder 3 on the image-capturing device 18.

In addition, in the embodiment, the gel-time detection apparatus 1 also includes a placement device 20, electrically connected to the controller 12. The placement device 20 includes a swivel arm 202 and a funnel 204 (of which the hidden profile is shown in dashed lines in FIG. 1) disposed on the swivel arm 202. The funnel 204 can be moved to a specific position (e.g. under the stirring device 16) by controlling the rotation of the swivel arm 202 through the controller 12, so that the powder 3 can be placed on the carrier 14 in a similar distribution through the funnel 204, or the funnel 204 can be moved away from the specific position for avoiding interference with the movement of the stirring rod 162 or the operation of other components (e.g. image capture, illumination, etc.). In practice, the swivel arm 202 can also be implemented by a telescopic arm, which also can achieve the aforementioned functions of locating, moving the funnel 204. In addition, in practice, the placement device 20 may be equipped with a weighing scale and a feeder (or a combination thereof), for automatically measure a required amount of the powder 3 into the funnel 204, which can improve the accuracy of powder feeding, eliminate the variation of powder feeding by operators, and help the gel-time detection apparatus 1 to objectively determine the gel time of the powder 3.

Please refer to FIG. 3, which is a flow chart of a gel-time detection method according to the invention. For simplification of illustration, the gel-time detection method uses the gel-time detection apparatus 1. For the relevant descriptions of the gel-time detection apparatus 1, please refer to the foregoing and relevant figures, which will not be described in addition. In logic, the gel-time detection method is to place the powder 3 to be detected on the carrier 14, as shown by the step S102; heat the powder 3 through the carrier 14 to liquefy the powder into liquefied powder 3 (also referring to FIG. 1), as shown by the step S104. Then, the gel-time detection method is to continuously stir the liquefied powder 3 through the stirring rod 162 (as shown by the step S106*a*), periodically sense a torque of the stirring rod 162 stirring the liquefied powder 3 through the torque meter 164 (as shown by the step S106*b*), and periodically capture images of the liquefied powder 3 through the image-capturing device 18 (as shown by the step S106*c*). The gel-time detection method is to determine a gel time of the powder 3 according to a determination criterion relevant to the torque and the images, as shown by the step S108.

Please also refer to FIG. 3. In an embodiment, the gel-time detection method is to move the funnel 204 to a specific position (by controlling the rotation of the swivel arm 202), as shown by the step S202; place a proper amount of the powder 3 on the carrier 14 through the funnel 204, as shown by the step S204. Therein, the amount of the placed powder 3 is, for example but not limited to 0.2 gram, and can be set according to its test specifications. Furthermore, the powder 3 can be obtained by taking a piece of leftover material of an adhesive sheet and rubbing it against each other; however, it is not limited thereto in practice. Afterward, the gel-time detection method is to move the funnel 204 away from the specific position (or retract the funnel 204), as shown by the step S206; wait for 20 seconds for liquefying the powder 3 into liquefied powder 3, as shown by the step S208. Therein, the waiting time is set according to the test specification in practice, and is not limited to 20 seconds. Furthermore, in the waiting time, the carrier 14 heats the powder 3 (in which the heating temperature is set according to the test specification and can be controlled by the controller 12, for example, implemented before the step S204). Afterwards, the gel-time detection method is to control the stirring rod 162 to start stirring the liquefied powder 3 (e.g. by lowering the stirring rod 162 and moving the stirring rod 162 in a predetermined stirring trajectory, e.g. at a constant speed) and turn on the image-capturing device 18, as shown by the step S210.

Afterwards, the gel-time detection method is to control the torque meter 164 to sense the torque of the stirring rod 162 stirring the liquefied powder 3 (e.g. receiving a torque sensing signal from the torque meter 164 at a predetermined frequency), as shown by the step S212*a*; control the image-capturing device 18 to capture images of the liquefied powder 3 (e.g. receiving images from the image sensors 182 at the same time or at the same frequency), as shown by the step S212*b*. Therein, the frequency for the torque sensing and the image capturing can be determined by the required precision of the gel time, for example but not limited to 10 times per second (or a period of 0.1 second). The torque sensing signals are collected, for example from a shaft card through the RS485 interface (depending on the control mechanism of the stirring device 16 in practice). Then, the gel-time detection method is to determine whether the sensed torque and the status of the liquefied powder 3 in the images meet the determination criterion, as shown by the step S214. Furthermore, in practice, the determination criterion may include the torque is greater than a predetermined threshold and the area shrinkage rate of the liquefied powder 3 in the images reaches a predetermined threshold. The predetermined threshold can be set by training the gel-time detection apparatus 1, which will be described in the following. Therein, the area of the liquefied powder 3 can be obtained by an image recognition technology (e.g. including edge detection), which will not be described in addition. The area shrinkage rate of the liquefied powder 3 can be obtained by a difference between the areas of the liquefied powder 3 in the current image and the previous image (e.g. defining as the ratio of the difference to the area in the current image).

When the judgment of the step S214 is true, the time at this time is set as the gel time of the powder 3, as shown by the step S216. Afterwards, the gel-time detection method is to continue the step S218, lifting the stirring rod 162 and cleaning the carrier 14 (or the surface thereof used for carrying the powder 3, e.g. for removing residues during the gelation of the liquefied powder 3, surface oxides on the carrier 14, etc.). Afterwards, the current gel-time detection is ended. In practice, the step S218 may be executed before the step S202. Furthermore, in the embodiment, when the judgment of the step S214 is false, the flow returns back to the steps S212*a* and S212*b* so as to sense the torque of the stirring rod 162 stirring the liquefied powder 3 and capturing images of the liquefied powder 3 again, and perform the judgment in the step S214 again, which will not be described in addition.

In the embodiment, depending on the actual configuration of the gel-time detection apparatus 1, the above steps can be completely or at least mostly completed automatically by the gel-time detection apparatus 1. Therefore, the determination of the gel time can eliminate or effectively reduce the subjective influence of the operator and improve the reliability of the gel time.

Figure 4:
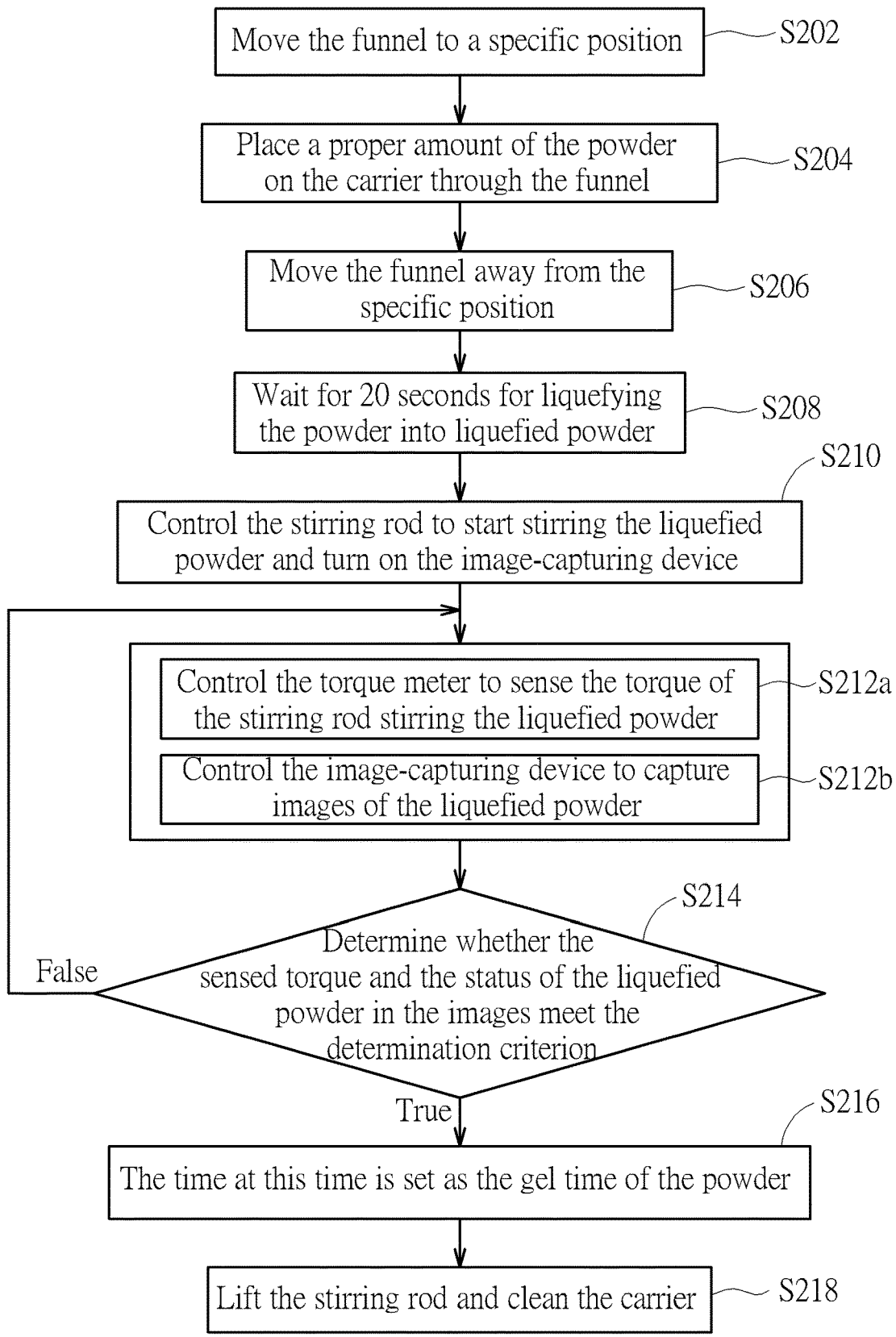
FIG. 4 is a flow chart of a gel-time detection method of an embodiment according to the invention.
Figure 5:
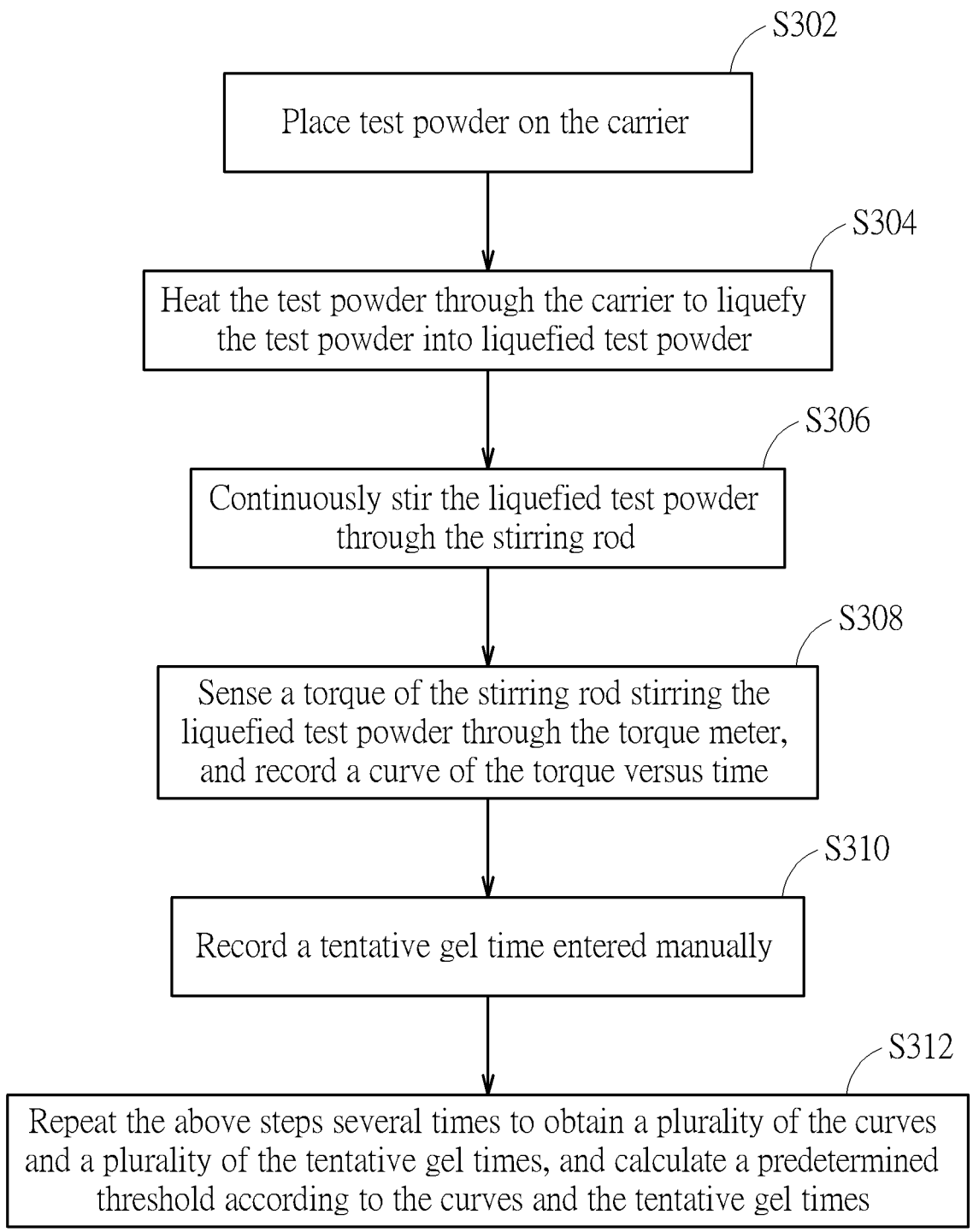
FIG. 5 is a flow chart of a method for determining a torque threshold for gel-time detection according to the invention.
Figure 6:
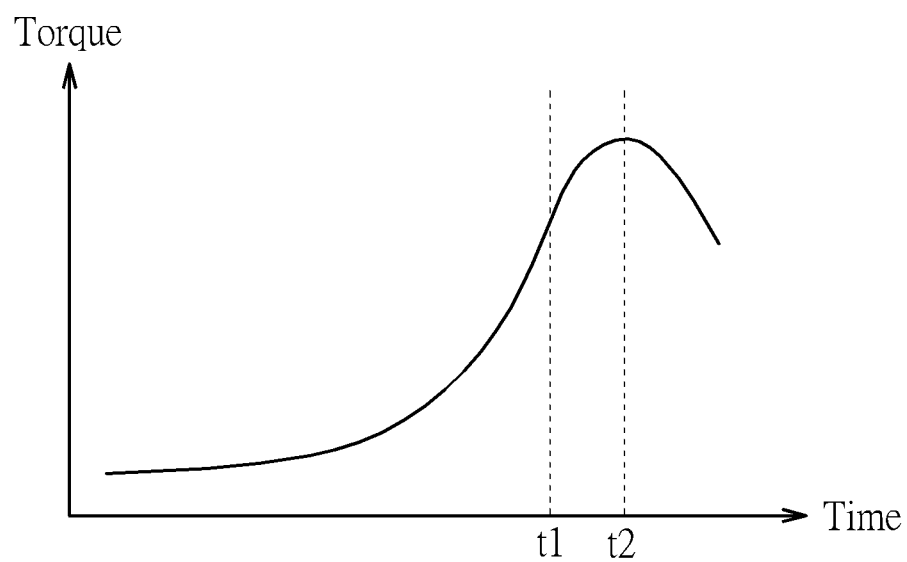
FIG. 6 is a schematic diagram illustrating a curve of the torque versus time obtained according to the method for determining a torque threshold in FIG. 5.

Please refer to FIG. 5, which is a flow chart of a method for determining a torque threshold for gel-time detection according to the invention. For simplification of illustration, the method for determining a torque threshold is applied to the gel-time detection in FIG. 3 and FIG. 4. For the relevant descriptions of the gel-time detection apparatus 1, please refer to the foregoing and relevant figures, which will not be described in addition. In logic, the method for determining a torque threshold is to place test powder on the carrier 14, as shown by the step S302. Therein, the test powder has the same adhesive composition as the powder 3, and therefore, for other descriptions about placing, heating, stirring and sensing the test powder, please refer to the relevant descriptions of the powder 3, which will not be described in addition. Then, the method for determining a torque threshold is to heat the test powder through the carrier 14 to liquefy the test powder into liquefied test powder, as shown by the step S304; continuously stir the liquefied test powder through the stirring rod 162, as shown by the step S306; sense a torque of the stirring rod 162 stirring the liquefied test powder through the torque meter 164, and record a curve of the torque versus time (a suitable example is shown by FIG. 6), as shown by the step S308; record a tentative gel time entered manually (e.g. the time t1 in FIG. 6), as shown by the step S310; repeat the above steps several times to obtain a plurality of the curves and a plurality of the tentative gel times (new test powder must be sampled for each repetition), and calculate a predetermined threshold (as the torque threshold) according to the curves and the tentative gel times, as shown by the step S312. Therein, in practice, when the liquefy test powder gels into a mass through the stirring, recording data for the curve is stopped. The curve of the torque versus time can be smoothed or curve fitted (as shown by FIG. 6), which is conducive to data analysis. Besides, the predetermined threshold may be calculated according to peaks (e.g. the time t2 in FIG. 6) of the curves and the tentative gel times (e.g. the time t1 in FIG. 6); however, the invention is not limited thereto. Furthermore, the method for determining a torque threshold is to train the gel-time detection apparatus 1 for the torque threshold, so the instructions for using the gel-time detection apparatus 1 mentioned above are also applied here if applicable, which will not be described in addition. As discussed above, the determination of the torque threshold is also objective in principle, so the method can provide an objective criterion for the determination of the gel time in the gel-time detection.

Figure 7:
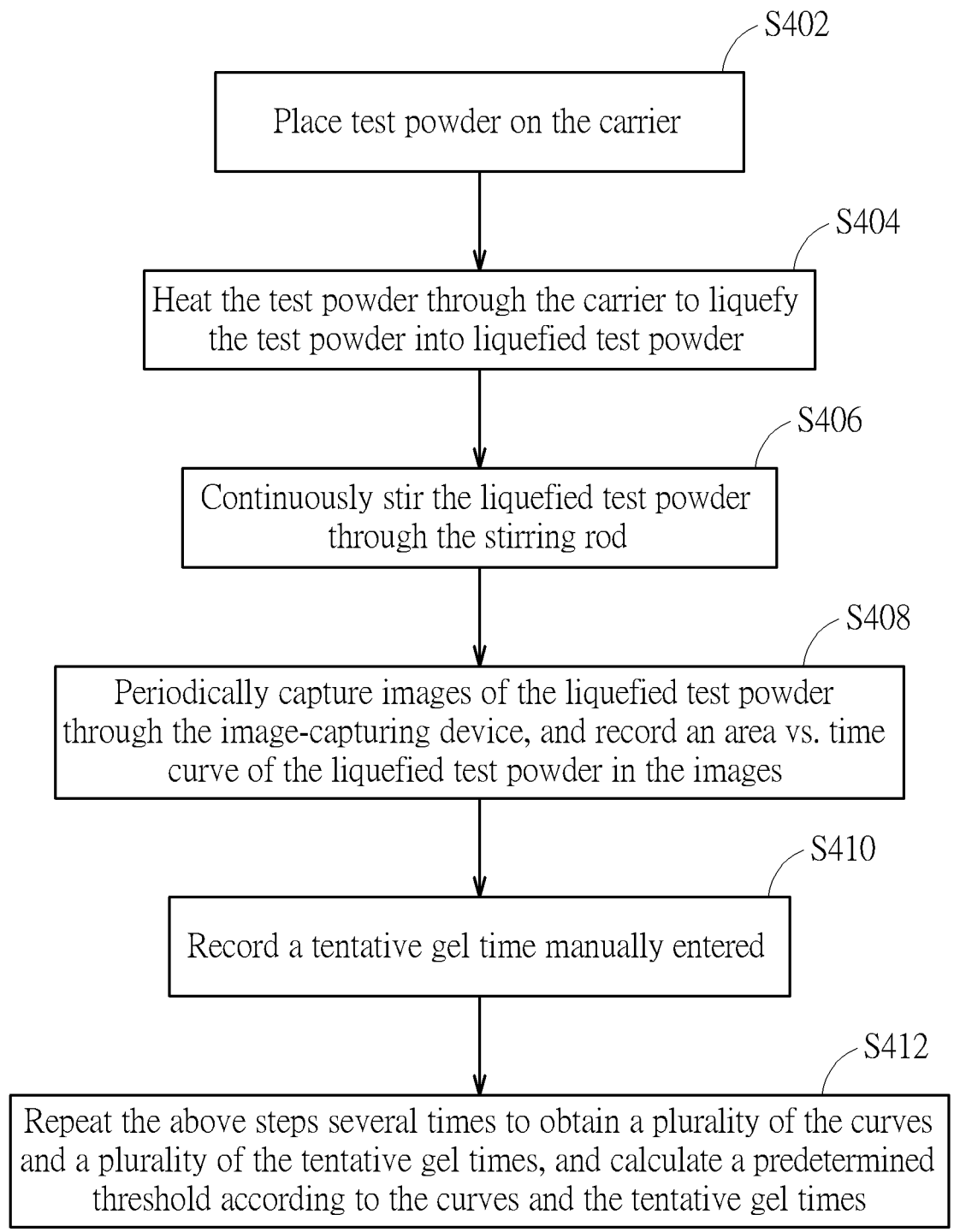
FIG. 7 is a flow chart of a method for determining an area-shrinkage-rate threshold for gel-time detection according to the invention.
Figure 8:
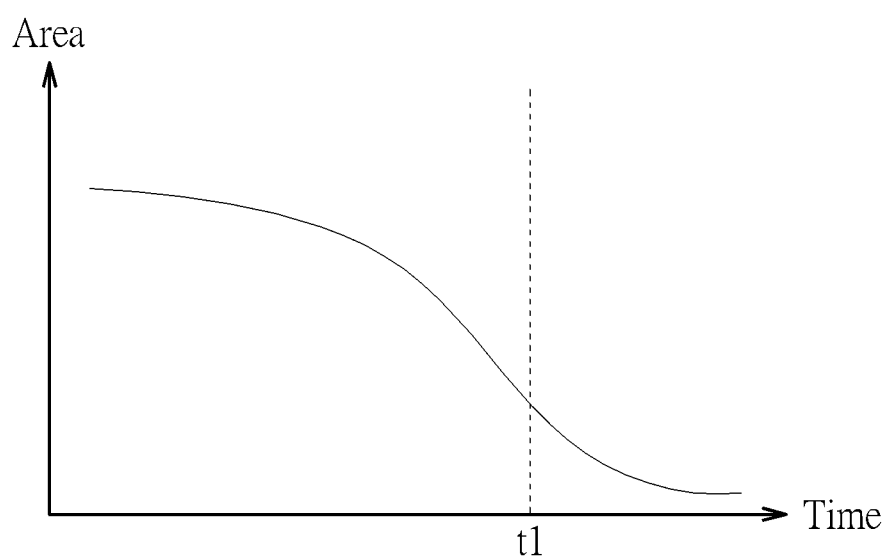
FIG. 8 is a schematic diagram illustrating a curve of the area versus time obtained according to the method for determining an area-shrinkage-rate threshold in FIG. 7.
Figure 9:
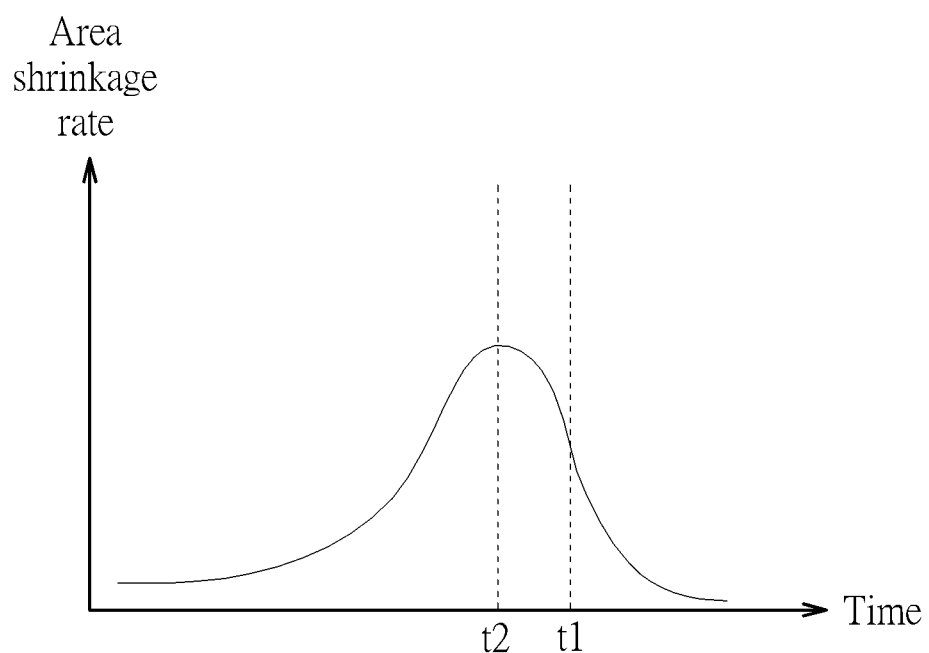
FIG. 9 is a schematic diagram illustrating an area-shrinkage-rate vs. time curve is calculated from the area vs. time curve in FIG. 8.

Please refer to FIG. 7, which is a flow chart of a method for determining an area-shrinkage-rate threshold for gel-time detection according to the invention. For simplification of illustration, the method for determining an area-shrinkage-rate threshold is applied to the gel-time detection in FIG. 3 and FIG. 4. For the relevant descriptions of the gel-time detection apparatus 1, please refer to the foregoing and relevant figures, which will not be described in addition. In logic, the method for determining an area-shrinkage-rate threshold is to place test powder on the carrier 14, as shown by the step S402. Therein, the test powder has the same adhesive composition as the powder 3, and therefore, for other descriptions about placing, heating, stirring and sensing the test powder, please refer to the relevant descriptions of the powder 3, which will not be described in addition. Then, the method for determining an area-shrinkage-rate threshold is to heat the test powder through the carrier 14 to liquefy the test powder into liquefied test powder, as shown by the step S404; continuously stir the liquefied test powder through the stirring rod 162, as shown by the step S406; periodically capture (or at a frequency) images of the liquefied test powder through the image-capturing device 18, and record an area vs. time curve (as shown by FIG. 8; therein, the curve in the figure is only qualitatively shown for simplification of illustration) of the liquefied test powder in the images, as shown by the step S408; record a tentative gel time manually entered (e.g. the time t1 in FIG. 8 and FIG. 9), as shown by the step S410; repeat the above steps several times to obtain a plurality of the curves and a plurality of the tentative gel times (new test powder must be sampled for each repetition), and calculate a predetermined threshold (as the area-shrinkage-rate threshold) according to the curves and the tentative gel times, as shown by the step S412. Therein, in practice, when the liquefy test powder gels into a mass through the stirring, recording data for the curve is stopped. The area vs. time curve can be smoothed or curve fitted (as shown by FIG. 8), which is conducive to data analysis. Besides, an area-shrinkage-rate vs. time curve can be calculated (e.g. by differentiation) from the area vs. time curve, as shown by FIG. 9; the predetermined threshold can be calculated from peaks (e.g. the time t2 in FIG. 9) of the plurality of area-shrinkage-rate vs. time curves and the plurality of tentative gel times (e.g. the time t1 in FIG. 9). However, the invention is not limited thereto. Furthermore, the method for determining an area-shrinkage-rate threshold is to train the gel-time detection apparatus 1 for the area-shrinkage-rate threshold, so the instructions for using the gel-time detection apparatus 1 mentioned above are also applied here if applicable, which will not be described in addition. Similarly, as discussed above, the determination of the area-shrinkage-rate threshold is also objective in principle, so the method can provide an objective criterion for the determination of the gel time in the gel-time detection.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A gel-time detection apparatus, comprising:
   a carrier, used for carrying powder to be detected and heating the powder to be liquefied into liquefied powder;
   a stirring device, comprising a stirring rod and a torque meter coupled with the stirring rod, the stirring rod stirring the liquefied powder, the torque meter sensing a torque of the stirring rod stirring the liquefied powder;
   an image-capturing device, disposed toward the carrier to capture images of the liquefied powder; and
   a controller, electrically connected to the stirring device and the image-capturing device, the controller determining a gel time of the powder according to a determination criterion relevant to the torque and the images.

2. The gel-time detection apparatus according to claim 1, wherein the determination criterion comprises the torque being greater than a predetermined threshold.

3. The gel-time detection apparatus according to claim 1, wherein the determination criterion comprises an area shrinkage rate of the liquefied powder in the images reaching a predetermined threshold.

4. The gel-time detection apparatus according to claim 1, further comprising a funnel, through which the powder to be detected is spread on the carrier.

5. The gel-time detection apparatus according to claim 1, wherein the image-capturing device comprises a plurality of image sensors.

6. A gel-time detection method, comprising the following steps of:
placing powder to be detected on a carrier;
heating the powder through the carrier to liquefy the powder into liquefied powder;
continuously stirring the liquefied powder through a stirring rod;
periodically sensing a torque of the stirring rod stirring the liquefied powder through a torque meter;
periodically capturing images of the liquefied powder through an image-capturing device; and
determining a gel time of the powder according to a determination criterion relevant to the torque and the images.

7. The gel-time detection method according to claim 6, wherein the determination criterion comprises the torque being greater than a predetermined threshold.

8. The gel-time detection method according to claim 7, wherein the predetermined threshold is obtained by the following steps of:
placing test powder on the carrier;
heating the test powder through the carrier to liquefy the test powder into liquefied test powder;
continuously stirring the liquefied test powder through the stirring rod;
sensing a torque of the stirring rod stirring the liquefied powder through the torque meter, and recording a curve of the torque versus time;
recording a tentative gel time entered manually corresponding to the curve; and
repeating the above steps several times to obtain a plurality of the curves and a plurality of the tentative gel times, and calculating the predetermined threshold according to the curves and the tentative gel times.

9. The gel-time detection method according to claim 8, wherein the predetermined threshold is calculated according to peaks of the curves and the tentative gel times.

10. The gel-time detection method according to claim 6, wherein the determination criterion comprises an area shrinkage rate of the liquefied powder in the images reaching a predetermined threshold.

11. The gel-time detection method according to claim 10, wherein the predetermined threshold is obtained by the following steps of:
placing test powder on the carrier;
heating the test powder through the carrier to liquefy the test powder into liquefied test powder;
continuously stirring the liquefied test powder through the stirring rod;
periodically capturing images of the liquefied test powder through the image-capturing device, and recording an area vs. time curve of the liquefied test powder in the images;
recording a tentative gel time entered manually corresponding to the curve; and
repeating the above steps several times to obtain a plurality of the curves and a plurality of the tentative gel times, and calculating the predetermined threshold according to the curves and the tentative gel times.

12. The gel-time detection method according to claim 11, wherein an area-shrinkage-rate vs. time curve is calculated from each area vs. time curve, and the predetermined threshold is calculated from peaks of the plurality of area-shrinkage-rate vs. time curves and the plurality of tentative gel times.

13. The gel-time detection method according to claim 6, wherein the powder to be detected is placed on the carrier through a funnel.

14. A method for determining a torque threshold for gel-time detection, comprising:
placing test powder on a carrier;
heating the test powder through the carrier to liquefy the test powder into liquefied test powder;
continuously stirring the liquefied test powder through a stirring rod;
sensing a torque of the stirring rod stirring the liquefied test powder through a torque meter, and recording a curve of the torque versus time;
recording a tentative gel time entered manually corresponding to the curve; and
repeating the above steps several times to obtain a plurality of the curves and a plurality of the tentative gel times, and calculating a predetermined threshold as the torque threshold according to the curves and the tentative gel times.

15. The method for determining a torque threshold according to claim 14, wherein the predetermined threshold is calculated according to peaks of the curves and the tentative gel times.

16. A method for determining an area-shrinkage-rate threshold for gel-time detection, comprising:
placing test powder on a carrier;
heating the test powder through the carrier to liquefy the test powder into liquefied test powder;
continuously stirring the liquefied test powder through a stirring rod;
periodically capturing images of the liquefied test powder through an image-capturing device, and recording an area vs. time curve of the liquefied test powder in the images;
recording a tentative gel time manually entered corresponding to the curve; and
repeating the above steps several times to obtain a plurality of the curves and a plurality of the tentative gel times, and calculating a predetermined threshold as the area-shrinkage-rate threshold according to the curves and the tentative gel times.

17. The method for determining an area-shrinkage-rate threshold according to claim 16, wherein an area-shrinkage-rate vs. time curve is calculated from each area vs. time curve, and the predetermined threshold is calculated from peaks of the plurality of area-shrinkage-rate vs. time curves and the plurality of tentative gel times.

* * * * *